Aug. 19, 1969 L. L. CRAWFORD ET AL 3,461,482
HIDE STRIPPING APPARATUS
Original Filed June 14, 1965 4 Sheets-Sheet 1
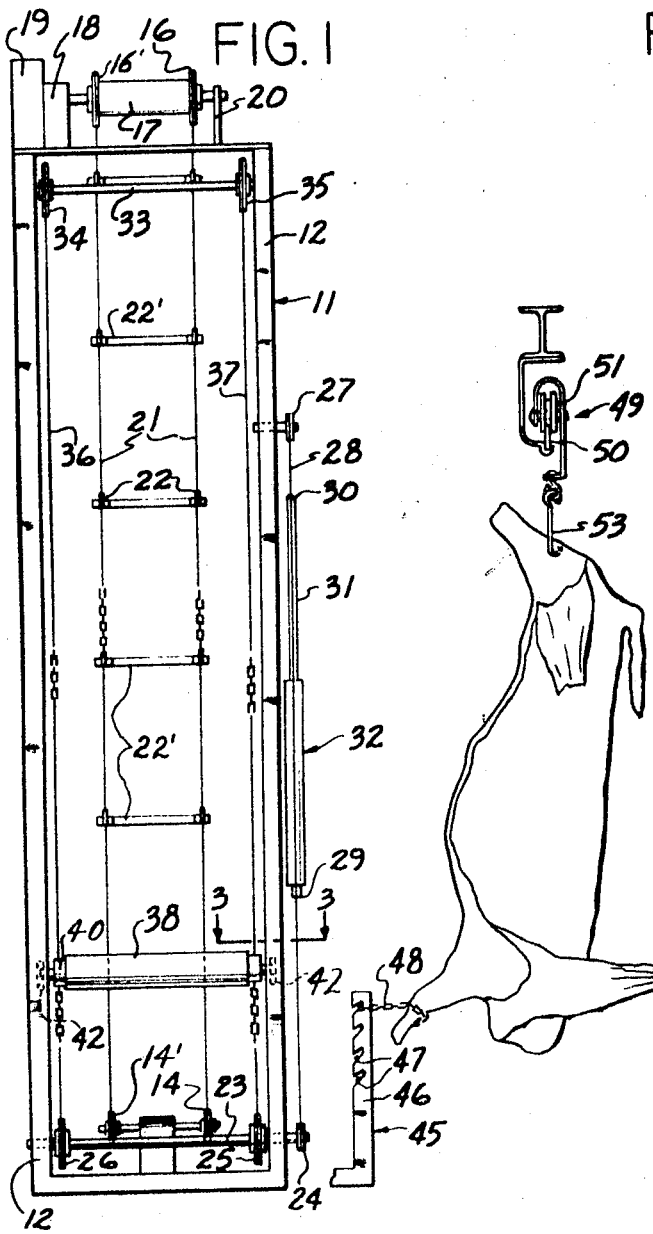
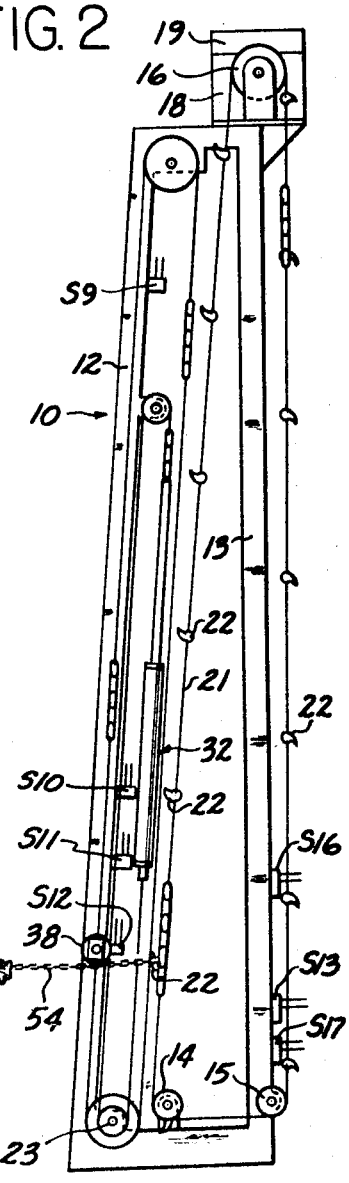
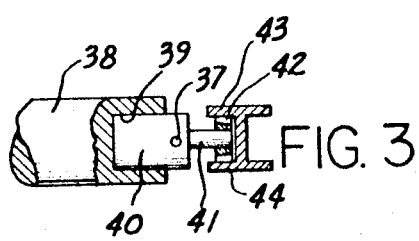
INVENTORS
Louis L. Crawford
Thor E. Christensen
Vincent Sondej
Miles S. Bajcar
ATTORNEY INVENTORS
Louis L. Crawford
Thor E. Christensen
Vincent Sondej
Miles S. Barcar

ATTORNEY

INVENTORS
Louis L. Crawford
Thor E. Christensen
Vincent Sondej
Miles S. Bajcar

ATTORNEY

INVENTORS
Louis L. Crawford
Thor E. Christensen
Vincent Sondej
Miles S. Bajcar

ATTORNEY

United States Patent Office 3,461,482
Patented Aug. 19, 1969

3,461,482
HIDE STRIPPING APPARATUS
Louis L. Crawford, Chicago, Thor E. Christensen, Maywood, and Vincent S. Sondej and Miles S. Bajcar, Chicago, Ill., assignors to Chemetron Corporation, Chicago, Ill., a corporation of Delaware
Original application June 14, 1965, Ser. No. 463,530. Divided and this application Feb. 6, 1967, Ser. No. 630,163
Int. Cl. A22b 5/16
U.S. Cl. 17—21              10 Claims

ABSTRACT OF THE DISCLOSURE

Apparatus having an upstanding frame for holding a hide covered carcass and a roll movably mounted on the frame for engaging the hide to progressively strip the hide from the carcass.

---

This is a division of the patent application of Louis L. Crawford, Thor E. Christensen, Vincent S. Sondej and Miles S. Bajcar, Ser. No. 463,530, filed June 14, 1965, now Patent No. 3,324,505, issued June 13, 1967.

This invention relates to apparatus for stripping hide from a drawn animal carcass.

The apparatus is used for stripping hide from a drawn animal carcass, the hide of the carcass having been loosened or stripped away from the fore and hind legs and the hide of the carcass having been cut lengthwise from end to end along its underside. The carcass is suspended most preferably by its hind legs, and the carcass is placed in a convenient location for stripping. The fore legs of the carcass are anchored to prevent undue sway of the carcass during the stripping operation and to counteract the forces exerted on the carcass as the hide is being stripped away. Force is exerted on the hide of the fore legs of the carcass to cause the hide to be progressively stripped from the carcass. A force is also exerted against the hide, for example by a roll, between the hide of the fore legs and the place where the hide is progressively being stripped from the carcass. Thus, the hide of the fore legs is pulled upwardly so that the stripped hide passes beneath and partially around the roll which is moved upwardly to determine the angle at which the hide is stripped from the carcass, the upward movement of the roll being controlled to strip the hide from the carcass at the desired angles.

In a preferred method of practicing the invention, the roll is positioned so that when the hide of the fore legs is passed in underlying relation to the roll and the pulling force is started, the hide of the fore legs extend generally perpendicularly to the carcass. When the pulling force is started, the roll is preferably moved upwardly at such a slow rate of speed that the angle at which the hide is being stripped from the carcass gradually decreases. After some stripping of the hide is completed and the fatty regions of the carcass are to be stripped, the roll is moved upwardly at a relatively fast rate of speed so that the angle at which the hide is there stripped becomes more acute. Thereafter, as the hide is to be stripped from the leaner regions of the carcass the roll is moved upwardly at a moderate rate of speed, a rate of speed between that of the slow and fast rates, so that the angle at which the hide is stripped from the carcass becomes less acute. When the roll has been moved to approximately the same horizontal elevation as the posterior of the carcass, the upward movement of the roll is interrupted, but the hide continues to be stripped from the carcass until it is completely removed because the pulling force on the hide of the fore legs continues. Although the roll moves upwardly at different rates of speed, pull is exerted on the hide of the fore legs at a constant rate of speed. It is to be understood that the rate or rates of speed at which the roll is moved upwardly depends upon various factors such as the type of animal being stripped, the age of the animal, and the amount and distribution of fat on the animal.

The expression "animal," as used in this application, by way of example, not limitation, includes bovine animals such as cows, bulls and steers, as well as hogs, sheep and the like.

Apparatus for carrying out the method of the invention comprises, in one specific embodiment, an upstanding frame with a roll mounted for upward and downward movement relative to the frame, and means for driving the roll selectively upwardly and downwardly. A sprocket is rotatably mounted at the upper end of the frame and another sprocket is rotatably mounted at the lower end of the frame. A chain is trained over both such sprockets, one end of the chain being connected to one end of a piston rod of a double-acting, double rod end, piston-cylinder mechanism while the other end of the chain is connected to the other end of the piston rod. The sprocket at the lower end of the frame drives a shaft to which a pair of spaced sprockets is secured. A corresponding pair of spaced sprockets is rotatably mounted at the upper end of the frame. A pair of spaced apart chains is trained over the upper and lower pairs of sprockets. The ends of each chain of the pair of chains are connected to the ends of the rotatable roll. Actuation of the double-acting cylinder mechanism can drive the roll selectively upwardly and downwardly and the rate at which fluid passes into or out of the cylinder mechanism controls the rate at which the roll moves.

Another pair of spaced apart sprockets is mounted at the upper end of the frame while another pair of spaced apart sprockets is mounted at the lower end of the frame. A pair of spaced apart chains, carrying horizontally aligned hooks, are trained over these sprockets. The upper sprockets are driven as a unit.

As carcasses vary as to weight and consequently length, the roll would be moved to a low starting position in the frame to strip the hide from a heavy, and hence long, carcass; the roll would be moved to a higher starting position in the frame for a lighter, and hence shorter, carcass. Thus, upon visual inspection of the length of the carcass, the roll can be brought to a desired starting position. Provision is made so that a generally horizontally aligned pair of hooks are brought to rest at approximately the level of the lower surface of the roll. A chain or the like connected to the hide of one fore leg can be hooked to one of the hooks and another chain or the like connected to the hide of the other fore leg can be hooked to the other one of the hooks. During the stripping operation the roll moves upwardly at such a rate that the angles at which the hide is stripped from the carcass are desirable angles. Timing means control the length of time the roll moves upwardly at any preselected rate of speed. When the roll approaches the end of its travel, time delay is instituted to prevent the premature return of the roll to one of its starting positions.

FIGURE 1 is a front elevational view of a hide stripping apparatus for carrying out the method of the invention;

FIGURE 2 is a side elevational view of the apparatus shown in FIGURE 1, a rail from which an animal carcass is suspended, and means for anchoring the fore legs of the carcass;

FIGURE 3 is a sectional view taken along line 3—3 of FIGURE 1;

Figure 4:
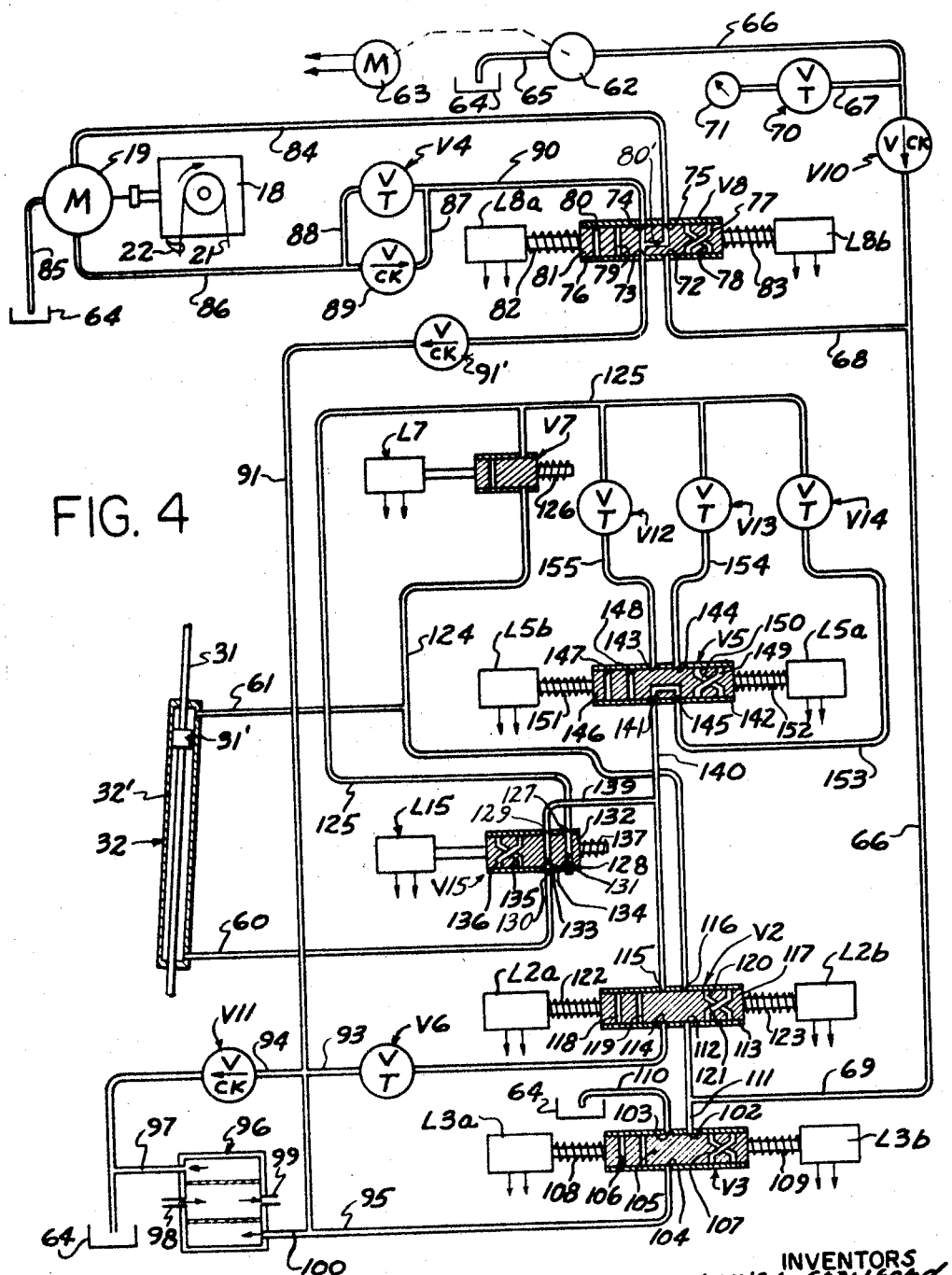
FIGURE 4 is a schematic view showing, in particular, valving by which the conveyor chains and roll can be controlled.

Referring now to FIGURES 1 and 2 of the drawings, there is shown a hide stripping apparatus generally indicated at 10 for carrying out the method of the invention. The apparatus 10 includes an upstanding frame 11 having parallel front members 12 and parallel rear members 13 preferably of H-beam construction. The front members 12 are inclined slightly with respect to the vertical, the inclination being away from the carcass from the lower end of the frame 11 to the upper end of the frame 11. The rear members 13 are shown to extend substantially vertically.

Spaced pairs of idler sprockets 14 and 14' are rotatably mounted by the lower end of the frame 11. A spaced pair of drive sprockets 16 and 16' are mounted to a drum 17 disposed at the upper end of the frame 11. The drum 17 is in turn mounted for rotation by a speed reducer 18 driven by motor 19 and by a bearing 20. Spaced conveyor chains 21 are trained over the sprockets 14 and 16 and 14' and 16', respectively. Each chain 21 carries hooks 22. The adjacent hooks 22 of adjacent chains 21 are horizontally aligned. The hooks 22 of each chain 21 are spaced at convenient distances along its length. The chains 21 and their hooks 22 move upwardly as a unit at the front of the frame 11. Straight horizontally aligned hooks 22, insure that the chains 21 move in exact synchronism to prevent one of the chains 21 from skipping on its sprocket 16 or 16'. The bars 22 also prevent the chains 21 from twisting over their unsupported lengths.

A shaft 23 is rotatably mounted by a lower end of the frame 11. Sprockets 24, 25 and 26 are securely mounted to the shaft 23. A sprocket 27 is rotatably mounted by one of the front members 12 at a substantial distance from the lower end of the frame 11. A chain 28 is trained over sprockets 24 and 27 and is connected at its opposite ends to the opposite ends 29 and 30 of a piston rod 31 of a double-acting, double rod end cylinder mechanism generally indicated at 32. An idler shaft 33, to which spaced apart sprockets 34 and 35 are secured, is rotatably mounted at the upper end of the frame 11. A chain 36 is trained over sprockets 26 and 34 while a chain 37 is trained over sprockets 25 and 35. The ends of the chains 36 and 37 are connected to the ends of a roll 38. The roll 38 is preferably constructed of metal having a polished surface. The roll 38 has a bore 39 at each end which receives a shaft 40 to which the ends of the chains 36 and 37 are connected. The shaft 40 has a reduced portion 41 which rotatably mounts a roller 42. Each roller 42 is guided for upward and downward movement in one of the front members 12 by flanges 43 and 44. Actuation of the piston cylinder mechanism 32 to shift the piston rod 31 in one direction will raise the roll 38 and actuation of the cylinder mechanism 32 in the opposite direction will move the piston rod 31 and hence the roll 38 in the opposite direction. Rotation of the drum 17 and the sprockets 16 and 16' which it carries will cause the chains 21 to move in unison so that the hooks 22 travel upwardly at the front and downwardly at the rear of the apparatus.

An anchor 45 has spaced apart upstanding members 46 (only one of which is shown). Each member 46 has notches 47 to which a chain 48, shackled to one of the front legs, is connected. Both legs being thus anchored, the carcass is held in position by two-point support at its front legs. Suitable suspension structure 49 for the carcass is shown to include rail 50 on which trolleys 51, only one of which is shown, can ride. Each trolley 51 includes a trolley frame 52 and a hook 53. The hook 53 of one trolley frame 52 is shown to pass through one of the hind legs of the carcass. Another hook 53 of another trolley frame 52 (not shown) is passed through the other of the hind legs, One chain 54 is looped around the hide of one fore leg. That one chain 54 is hooked onto a hook 22 at approximately the same level as the lower surface of the roll 38. The other chain 54 (not shown) is looped around the hide (not shown) of the other fore leg, and such other chain 52 is hooked onto the other hook 22 which is at the same level as the hook 22 onto which the one chain 54 is hooked.

A switch S9 is secured to one of the members 12 near the upper end of the path of travel of the roll 38.

Switch S10, S11 and S12 are secured to one of the members 12 at the front of the apparatus 10. Although the switches S10, S11 and S12 are disposed at the lower end of the frame 11, the switch S10 is above the switch S11, and the switches S10 and S11 are both above the switch S12. The switches S9, S10, S11 and S12 are actuated by the roll 38.

Switches S13, S16 and S17 are secured to one of the members 13. The switch S13 is below the switch S16 and the switch S17 is below both of the switches S13 and S16. The switches S13, S16 and S17 are actuated by the hooks 22.

Referring now to FIGURE 4 of the drawings, there is shown the double-acting, double rod end cylinder mechanism 32, with its piston rod 31. The cylinder mechanism 32 includes a cylinder 32' and a piston 31' secured to the piston rod 31. The piston rod 31 can be shifted upwardly by forcing hydraulic fluid under pressure through a conduit 60 and into the lower end of the cylinder 32', and by venting hydraulic fluid from the upper end of the cylinder 32' through a conduit 61, conversely, the piston rod 31 can be shifted downwardly by forcing hydraulic fluid under pressure through the conduit 61 and into the upper end of the cylinder 32', and by venting hydraulic fluid from the lower end of the cylinder 32' through the conduit 60.

A hydraulic pump 62, driven by an electric motor 63 or the like, can drawn hydraulic fluid from the reservoir or tank 64 containing hydraulic fluid through a conduit 65. The pump 62 discharges hydraulic fluid under pressure into and through a conduit 66, which has branch conduits 67, 68 and 69. The branch conduit 67 is connected to the conduit 66 downstream of the pump 62 and upstream of a check valve V10. The branch conduit 68 is connected to the conduit 66 downstream of the check valve V10 and upstream of the branch conduit 69. The branch conduit 67 contains an adjustable throttling valve 70 and a pressure gauge 71 located downstream of the valve 70.

A valve V8 has ports 72, 73, 74 and 75 in its tubular valve body 76. Passages 77, 78, 79 and 80 and 80' are formed in movable valve element 81 slidably mounted in the valve body 76. A solenoid L8a, when energized, can shift the valve element 81 to register the passage 79 with the ports 72 and 75 and to register the passage 80 with ports 73 and 74. A solenoid L8b, when energized, can shift the valve element 81 to register the passage 78 with the ports 72 and 74 and to register the passage 77 with the ports 73 and 75. When neither the solenoid L8a nor the solenoid L8b is energized, springs 82 and 83 return and hold the valve element 81 in the position shown in FIGURE 4.

The branch conduit 68 communicates with the port 72. A conduit 84 communicates with the port 75 and is connected to one side of the hydraulic motor 19 which drives the chains 21 through the speed reducer 18. Part of the hydraulic fluid delivered to the hydraulic motor 19 can be drained to the tank 64 through a conduit 85. A conduit 86 is connected to the other side of the hydraulic motor 19 and to conduits 87 and 88 which are connected to each other in parallel. The conduit 87 contains a check valve 89, and the conduit 88 contains an adjustable throttling valve V4. The conduits 87 and 88 are connected to a conduit 90 which communicates with the port 74. The setting of the throttling valve V4 controls the speed of the motor 19.

A conduit 91 communicates at one end with the port 73 and communicates with conduits 93, 94, 95 and 100. The conduit 91 contains a check valve 91' disposed between the port 73 and the place where the conduits 93 and 94 are connected to the conduit 91. The conduit 94 leads to the tank 64. The conduit 94 contains a check valve V11. A heat exchange 96 communicates with a discharge conduit 97 connected to the conduit 94 between the check valve V11 and the tank 64. The heat exchanger 96 has coolant inlet and outlet conduits 98 and 99, respectively.

A conduit 100 connects the ends of the conduits 91 and 95 and to the inlet side of the heat exchanger 96. The conduit 95 is connected to a valve V3 having a valve body 101 with ports 102, 103 and 104. A movable valve element 105 has a passage 106 which can communicate with ports 103 and 104 and passage 107 which can communicate with the ports 102 and 104. A solenoid L3a, when energized, can shift the valve element 105 to register the passage 106 with ports 103 and 104. Solenoid L3b, when energized can shift the valve element 105 to register the passage 107 with the ports 102 and 104. Springs 108 and 109 serve to return and maintain the valve element 105 in the position shown in FIGURE 4 when the solenoids L3a and L3b are de-energized.

A conduit 110 provides communication with the port 103 and the tank 64. A conduit 111 provides communication between the port 102 and the branch conduit 69, and the branch conduit 69 and the conduit 111 are in turn connected to a port 112 of the valve V2. The valve V2 has a tubular valve body 113, which in addition to port 112, has ports 114, 115 and 116. A movable valve element 117 has passages 118, 119, 120 and 121. A solenoid L2a, when energized, can shift the valve element 117 to register the passage 118 with the ports 114 and 115 and to register the passage 119 with the ports 112 and 116. A solenoid L2b, when energized, can shift the valve element 117 to register the passage 121 with the ports 114 and 116 and to register the passage 120 with the ports 112 and 115. Springs 122 and 123 serve to return and maintain the valve element 117 to the position indicated in FIGURE 4 when the solenoids L2a and L2b are de-energized.

A conduit 124 can provide communication with a port 116 and with a conduit 125. The conduit 124 communicates with the conduit 61. A valve V7 is disposed in the conduit 124 between its connection to the conduit 61 and its connection to the conduit 125.

The valve V7 can be opened by energizing the solenoid L7. Bias spring 126 returns the valve V7 to its closed position upon de-energization of the solenoid L7.

The conduit 125 is connected to a port 127 of a valve V15. The valve V15 includes a tubular valve body 128 which has, in addition to the port 127, ports 129, 130 and 131. A movable valve element 132 has passages 133, 134, 135 and 136. When the solenoid L15 is de-energized, a spring 137 causes the valve element 132 to be in the position shown in FIGURE 4 of the drawings to provide communication between the ports 129 and 130 through the passage 133 and to provide communication between the ports 127 and 131 through the passage 134. When the solenoid L15 is energized the valve element 132 is shifted to register the passage 135 with ports 129 and 131 and to register the passage 136 with the ports 127 and 130. A plug in port 131 prevents passage of fluid through the valve V15. The conduit 60 communicates at one end with the lower end of the cylinder 32' and at its other end with the port 130 of the valve V15. A conduit 139 communicates with the port 129 and with the conduit 140. The conduit 140 is connected at one end to the port 115 of the valve V2 and at the other end to a port 141 of a valve V5. The valve V5 has a tubular valve body 142, which has in addition to the port 141 ports 143, 144 and 145. A movable valve element 146 has passages 147, 148, 149 and 150. A solenoid L5b, when energized, can shift the valve element 146 to register passage 147 with ports 141 and 143 and to register passage 148 with ports 144 and 145. Solenoid L5a, when energized, can shift the valve element 146 to register the passage 149 with ports 141 and 144 and to register the passage 150 with ports 143 and 145. Springs 151 and 152 serve to return and maintain the valve element 146 at the position shown in FIGURE 4 when both the solenoids L5a and L5b are de-energized. A conduit 153 containing an adjustable throttling valve V14 is connected at one end to the port 145 and at its other end to the conduit 125. A conduit 154 containing an adjustable throttling valve V13 is connected at one end to the port 144 and at the other end of the conduit 125.

A conduit 155 containing an adjustable throttling valve V12 is connected at one end to the port 143 and at the other end to the conduit 125. An adjustable throttling valve V6 in the conduit 93 can control the rate at which hydraulic fluid can pass to the tank 64.

Figure 5:
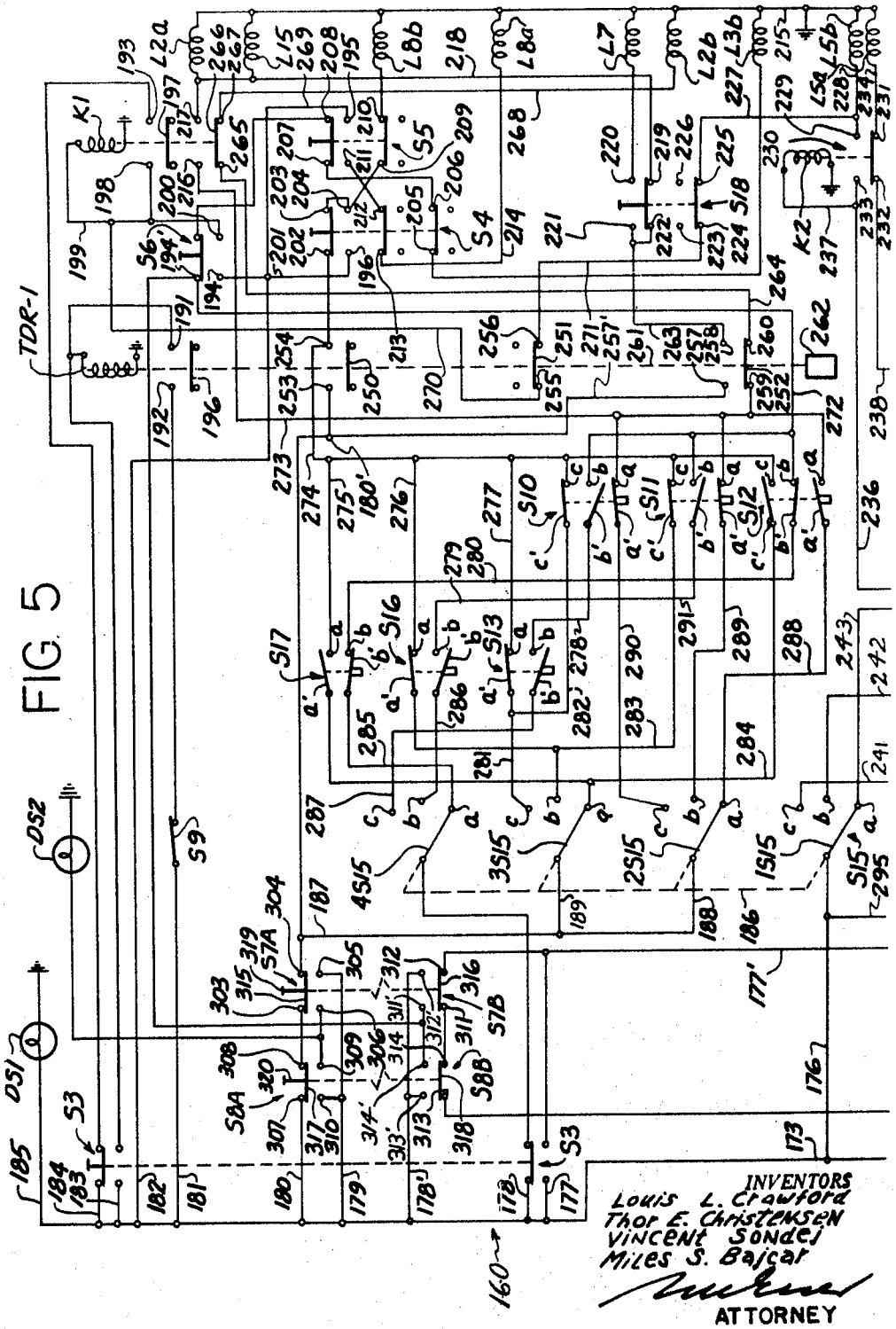
FIGURE 5 is a view showing a portion of a circuit diagram for hide stripping apparatus.
Figure 6:
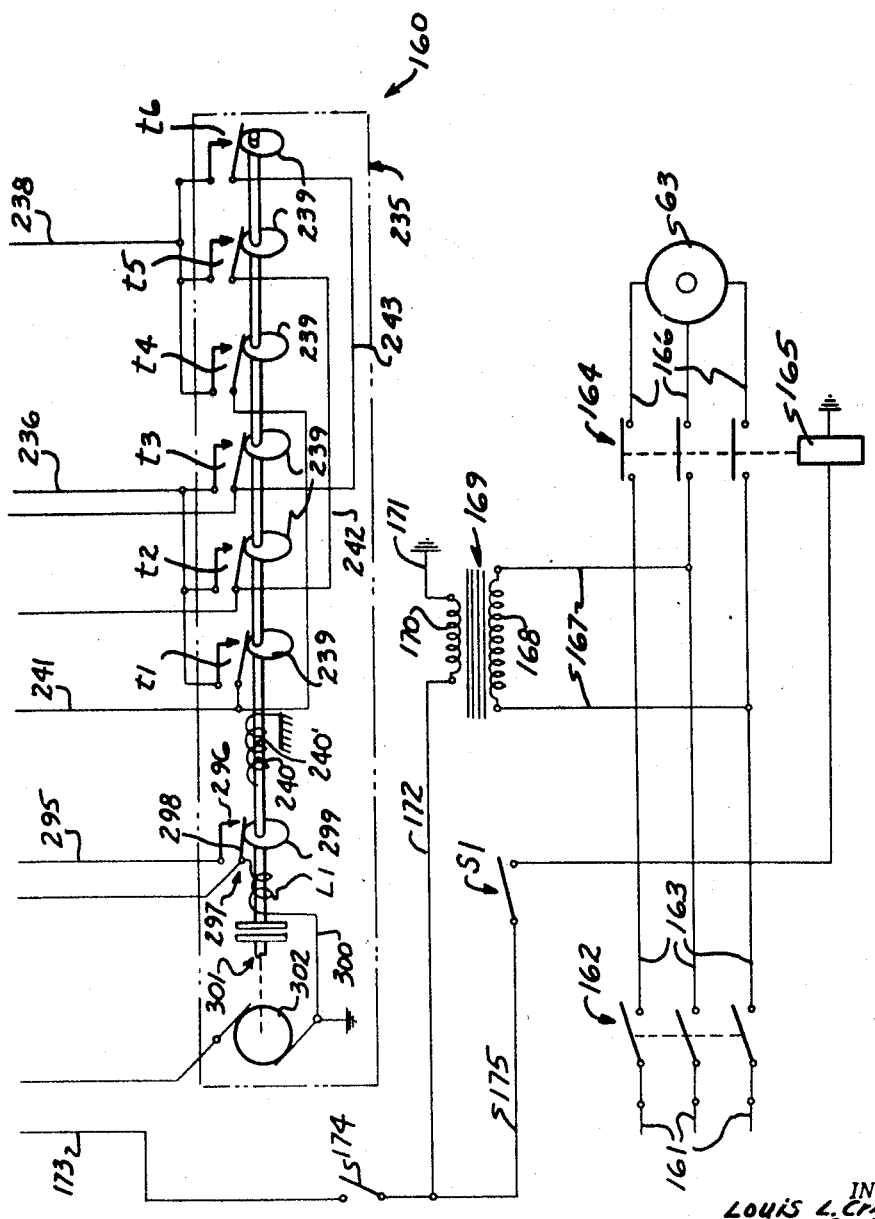
FIGURE 6 is a view showing the remaining portion of the circuit diagram for the hide stripping apparatus.

Referring now to FIGURES 5 and 6 of the drawings, there is shown a circuit diagram generally indicated at 160. Leads 161 from a suitable power supply are electrically connected to a set of switches 162 which are operable as a unit either into open or closed positions, respectively. When the switches 162 are closed, electrical energy passes through leads 163 to mechanically interconnected switches 164, which are either in the open position or in the closed position depending upon whether or not a solenoid 165 is de-energized or energized. When the switches 164 are closed, electrical energy is supplied to the electric motor 63 through leads 166. Leads 167 are connected to two of the leads 163 and to a coil 168 of the transformer generally indicated at 169. Another coil 170 of the transformer 169 is connected to a ground lead 171 and to a lead 172. The lead 172 is connected to a lead 173 which contains a switch 174. Lead 175 is connected at one end to the solenoid 165 and at the other end to the leads 172 and 173. The lead 175 contains a switch S1. The lead 173 is also connected to leads 176, 177, 178, 178', 179, 180, 181, 182, 183, 184 and 185.

A selector switch generally indicated at S15 is shown to have switch arms 1S15, 2S15, 3S15 and 4S15 which are mechanically interconnected as indicated by broken line 186. Each of the switch arms 1S15 through 4S15 have contacts a, b and c.

Lead 176 is connected to the switch arm 1S15. The lead 180 can be connected through switches S8A and S7A through lead 187 to leads 188 and 189, which are connected respectively to switch arms 2S15 and 3S15. The lead 178 containing a switch S3 is connected to the switch arm 4S15. The lead 183 containing the switch S3 is connected to a time delay relay TDR-1 and to a contact 191. The lead 181 containing the switch S9 is connected to a contact 192. The lead 184 also containing the switch S3 is connected to a contact 193. The lead 182 is connected to contacts 194, 195 and 196. The contacts 191 and 192 can be bridged by a switch element 196 when the time delay relay TDR-1 is energized, thus establishing a holding circuit. A switch element 197 can bridge the contact 193 and a contact 198. Contact 198 is connected by a lead 199 to coil relay K1. Lead 199 is also connected to a contact 200 of a switch S6. The switch S6 can be manually operated to bridge contacts 194 and 200. A lead 201 connects the contacts 194 of the switch S6 and the contact 196 of a switch S4. The switch S4 also has contacts 202, 203, 204, 205 and 206. A switch S5 has contacts 207, 208, 209 and 210, in addition to contact 195. Contacts 204 and 209 and contacts 212 and 211 of switches S4 and S5, respectively, are bridged. The contact 213 can be bridged to the contact 212. The contact 213 is connected by a lead 214 to the solenoid L8a, which in turn, is connected to a ground lead 215. The contact 210 is connected to the solenoid L8b, which in turn, is connected to the lead 215. Coil relay K1 can operate to a switch element 197 which can bridge the contacts 193 and 198. The contact 217 is connected to a lead 218. Solenoids L2a and L15 are connected in parallel to each other across leads 215 and 218. The lead 218 is connected to a contact 219 of a switch S18. Switch S18 also has contacts 220, 221, 222, 223, 224, 225, and 226. A lead 227 is connected to the contact 225 and to lead 228. The lead 228 is connected to the solenoid L5b which in turn is connected to the lead 215. The lead 228 is also connected to a contact 229 of a switch 230. Switch 230 also has contacts 231, 232, and 233. A switch element, actuated by coil relay K2, can alternately bridge contacts 229 and 233 and contacts 231 and 232. A lead 234 is connected to the contact 231 and to the solenoid L5a which in turn is connected to the ground lead 215.

A timer is generally indicated at 235. A lead 236 is connected to switches t1, t2 and t3 of the timer 235, and the switches t1, t2 and t3 are connected in parallel with respect to each other. A lead 237 is connected to the coil relay K2 which in turn is connected to ground. A lead 238 is connected to contact 232 and to switches t4, t5 and t6. Switches t4, t5 and t6 are connected to each other in parallel. Switches t1 through t6 are actuated by respective cams 239 mounted on a shaft 240.

Switches t1 and t4 are connected to a lead 241 which, in turn, is connected to the contact c associated with the switch arm 1S15. Switches t2 and t5 are connected to a lead 242, which in turn is connected to the contact b associated with the switch arm 1S15. Switches t3 and t6 are connected to a lead 243 which in turn is connected to the contact a associated with the switch arm 1S15.

The time delay relay TDR–1 actuates not only the switch element 196, but the switch elements 250, 251, and 252 as well. The switch element 250 can bridge the contacts 253 and 254, the switch elements 251 can bridge the contacts 255 and 266; and the switch element 252 can bridge contacts 257 and 258 and the contacts 259 and 260. The switch elements 196, 250, 251 and 252 are mechanically interconnected to move as a unit. A time delay element, for example, a dashpot 262, is operative to effect time delay when the switch element 252 moves from bridging engagement with the contacts 257 and 258 toward the contacts 259 and 260. The contacts 202 and 254 are connected to each other and the contacts 224 and 256 are also connected to each other. The contacts 221 and 222 are both connected to a lead 263 which in turn is connected to the contact 258. The contact 260 is connected by a lead 264 to a contact 265 which is bridged by a switch element 266 to a contact 267. The contact 267 is connected to a lead 268, which in turn is connected to a solenoid L2b, and the solenoid L2b is connected to the ground lead 215. A lead 269 connects the contact 195 to the leads 182 and 201. The contacts 203 and 204 are connected to each other, and the contacts 206 and 207 are also connected to each other.

The contact 255 is connected to the lead 199 by a lead 270 and the contacts 224 and 256 are connected to each other by a lead 271. A lead 272 is connected to a contact 194' and to switches S10, S11 and S12 at their respective contacts b. Contact 216 is connected by a lead 273 to contacts a of the switches S10, S11 and S12, respectively. A lead 274 is connected at one end to the contact 254 and to contacts c of the switches S10, S11 and S12, respectively. Leads 275, 276 and 277 are connected to the lead 274 and to contacts a of the switches S17, S16 and S13, respectively. Leads 278, 279 and 280 are connected to switch arms b' of switches S10, S11 and S12, respectively. The contact c associated with the switch arm 3S15 is connected by lead 281 to switch arm a' of switch S13. A lead 282 is connected to the switch arm c' of the switch S10. A lead 283 is connected to contact b associated with the switch arm 3S15 and to the switch arm a' of the switch S16 and also to the switch arm c' of the switch S11. A lead 284, connected to the contact a associated with the switch arm 3S15 is connected to the switch arm a' of the switch S17 and switch arm c' of the switch S12.

A lead 285 is connected to the contact a of switch 4S15 and to a switch arm b' of the switch S17. The switch arm b' is capable of establishing electrical contact with its associated contact b. A lead 286 is connected to the contact b associated with the switch arm 4S15 and is connected to switch arm b' of switch S16. This switch arm b' is associated with a contact b.

A lead 287 is connected at one end to the contact c associated with the switch arm 4S15, and to the switch arm b' of the switch S13. This switch arm b' can make electrical contact with an associated contact b. A lead 288 is connected to the contact a associated with the switch arm 2S15 and is also connected with a switch arm a' of the switch S12. A lead 289 is connected to the contact b associated with the switch arm 2S15 and to the switch arm a' of the switch S11. A lead 290 is connected to the contact c associated with the switch arm 2S15 and to the switch arm a' of the switch S10. A lead 291 is connected to the contact b of the switch S16 and to the switch arm b' of the switch S11. A lead 295 is connected to the lead 176 and to a contact 296 of a switch 297 having a switch arm 298. A cam 299 actuates the switch arm 298 to close and open the switch 297 by making and breaking contact with the contact 296. Closing of the switch 297 energizes a clutch coil L1, which is connected at one end by a lead 300 to ground. The clutch coil L1 actuates and deactuates a clutch 301. The clutch 301 is clutched to a synchronous motor 302 when the coil L1 is energized, and is declutched when the coil L1 is de-energized.

The switch S7A is disposed near one front member 12 and the switch S8A is disposed near the other front member 12. The switch S7A has contacts 303, 304, 305 and 306, and the switch S8A has contacts 307, 308, 309 and 310.

Switch S7B has contacts 311, 312, 311' and 312', the switch S8B has contacts 313, 314 and 313' and 314'. The switches S7A, S7B, S8A and S8B have movable switch elements 315, 316, 317 and 318. The switch elements 315 and 316 are actuated away from contact with contacts 303 and 304 and with contacts 311 and 312, respectively, when the knob 319 is depressed. Upon depression of the knob 319, the switch element 315 bridges the contacts 305 and 306 and contacts 311 and 312 are unbridged. The switch S8A has a knob 320 having the same function as the knob 319.

The operation of the hide stripping apparatus 10 is now to be described. When the switches 162 are closed, the transformer 169 is energized. When the switch S1 is closed, electrical energy from the transformer 169 energizes the solenoid 165, thus closing the switch 164 to cause energization of the electric motor 63. The motor 63 drives the pump 62 to pump hydraulic fluid into conduit 66. When the switch 174 is closed manually, electrical energy is supplied to leads 176 through 185. The lamp DS1 is illuminated to indicate that the apparatus 10 is ready to operate, also the solenoid L3b is energized through lead 178, switch S3, switch 4S15 and its associated contact a, lead 285, switch arm b' of S17 to lead 280, to switch arm b' of switch S12, lead 272 and switch S6, S5 and S4, thus allowing passage of hydraulic fluid to the heat exchanger 96 through the conduits 66, 69 and 111 by valve V3.

Momentary contact switch S3 is manually closed to energize relay TDR–1 through lead 183; energization of relay TDR–1 moves switch element 196 into bridging contact with contacts 191 and 192 and because switch S9 is closed, a holding circuit is established to maintain the relay TDR–1 energized.

Actuation of the momentary contact switch S3 also energizes the clutch coil L1 of the timer 235 by a circuit through leads 177, 177', clutch coil L1, and a lead 300 to ground. Simultaneously, the motor 302 is energized to rotate the shaft 240. Rotation of the shaft 240 closes switch 297 by cam 299. Holding current is now available to the clutch coil L1 and the motor 302, through leads 176 and 295.

Actuation of momentary contacts switch S3 breaks circuit through the lead 178 and de-energizes solenoid L3b, allowing the valve V3 to obtain the center position shown in FIGURE 4, thus blocking the flow of hydraulic fluid through the conduits 66, 69 and 111 to develop high pressure in the conduit 66.

The solenoid L8b is energized through the lead 180 and the switches S7A and S8A, contacts 253 and 254 by switch element 250, and switches S4 and S5, to direct hydraulic fluid through valve V8, through conduit 84 into the hydraulic motor 19, through conduit 86, valve V4, conduit 90, valve V8, conduit 91 and its check valve 91' and is returned to the tank 64 either through the conduit 94 or through the conduit 100, the heat exchanger 96, the conduit 97 and a portion of the conduit 94.

Operation of the hydraulic motor 19 drives the speed reducer 18 to impart motion to the chains 21. The chains 21 move in an upward direction at the front of the frame 11 and move in a downward direction at the rear of the frame 11. Any one of the hooks 22 can actuate any one of the switches S13, S16 or S17 to energize the solenoid L8b. Even though switches S13, S16 and S17 are actuated by each hook 22 of one of the chains 21, the circuits through these switches to the solenoid L8b are in parallel with each other, thus the solenoid L8b remains energized so long as one of the switches S13, S16 and S17 is not being actuated and so long as the switches S4 and S5, switch element 250 bridging switches 253 and 254, are in the position shown in FIGURE 5.

The solenoid L2a is also energized through the same path as the solenoid as L8b to junction 180', through the lead 257', the contacts 257 and 258 bridged by the switch element 252, the lead 263, a switch element of the switch S18 which bridges contacts 222 and 219, and the lead 218.

The selector switch S15 moves the switch arms 1S15 through 4S15 in unison so that these switch arms make electrical contact with their associated contacts a, b and c, respectively. Electrical energy is supplied to the switch arm 1S15 through lead 176, and electrical energy is supplied to the switch arms 2S15 and 3S15 through lead 180, lead 187 and through respective leads 188 and 189. Electrical energy is supplied to the switch arm 4S15 through lead 178.

The solenoid L15 is energized at the same time as the solenoid L2a is energized, causing element 132 of the valve V15 to allow passage of fluid being discharged from the lower end of cylinder 32', through the conduit 60, the port 130, the passage 136, the port 127, and the conduit 125. The discharged fluid now has passage available through all the valves V12, V13 and V14, but can only pass through one, based upon the downstream position of the valve V5, which will allow only passage of fluid from one of the valves V12, V13 and V14. As neither solenoid L5a nor L5b is energized, hydraulic fluid can only pass through the throttling valve V14 to the valve V5 which is in the position shown in FIGURE 4 of the drawings. The throttling valve V14 is adjusted to permit only a small amount of flow through it and thus the roll 38 is moved upwardly slowly. The roll 38 will continue to move upwardly at the slow rate determined by the valve V14 until a predetermined period of time has elapsed at the end of which the timer 235 energizes the solenoid L5b to cause element 146 of the valve V5 to register the passage 147 with the ports 141 and 143. This limits passage of hydraulic fluid from the lower end of the cylinder 32' through the throttling valve V12, thus allowing the roll 38 to move upwardly at a fast rate of speed for which the valve V12 is set. Because the roll 38 moves upwardly relatively fast, the angle at which the hide is stripped from the carcass becomes increasingly acute. Stripping the hide from the carcass at an acute angle is especially desirable where the carcass has a relatively large amount of fat at the interface between the hide and the meat.

At any time during the cycle when the roll 38 and/or the chains 21 move upwardly, should it be desired to interrupt the movement of the roll 38, maintained contact switches S7A and/or S8A can be actuated to de-energize the solenoid L8b thus blocking passage of hydraulic fluid to the hydraulic motor 19 to stop the motor 19. Also, the solenoid L2a is de-energized to block flow of hydraulic fluid to or from the cylinder 32' of the piston cylinder mechanism 32. Also, the circuit to the timing motor 302 is broken through switches S7B and/or S8B causing the timing motor 302 to stop while the clutch coil L1 remains energized to hold the motor 302 and the shaft 240 coupled together; in this way a spring 240' can not return the shaft 240 to its initial or starting position, thus the cycle of the timer 235 is not interrupted.

The solenoid L3b is also energized to relieve the high pressure in the conduit 66 by venting the conduit 66, through the conduit 69, the valve V3 and the heat exchanger 96 to the tank 64.

Switch S5 can be held closed manually for a desired period of time, thus de-energizing the solenoid L3b to block flow of hydraulic fluid through the conduit 95 to the heat exchanger 96 so that pressure can be built up in the conduit 66; also the solenoid L8a is energized to allow the chains 21 to move downwardly at the front of the frame 11. So long as the switch S5 is held closed, the chains 21 move downwardly.

When the switch S4 is held closed manually for a desired period of itme, the solenoid L3b is de-energized, the solenoid L8b is energized so long as the switch S4 is held closed, thereby causing the chains 21 to move upwardly at the front of the frame 11.

In order to continue the cycling of the roll 38 the switch S7A and/or the switch S8A are manually reset by manual movement of knobs 319 and 320. This de-energizes solenoid L3b to block the passage of hydraulic fluid to the conduit 95, the heat exchanger 96, the conduits 97 and 94, to the tank 64. Solenoid L8b is also re-energized to direct hydraulic fluid through the valve V8 to the hydraulic motor 19 to effect upward movement of the chains 21.

The circuit to the motor 302 is also re-established so the shaft 240 continues to rotate the cams 239 and 299. The circuit to the light DS2 is also broken because contacts 229 and 233 of the switch 230 are no longer bridged. It is not until the switch 230 bridges the contacts 231 and 232 can the solenoid L5a be energized.

When the roll 38 trips switch S9 the holding circuit which holds time delay relay TDR-1 energized is broken, and after a time delay the solenoids L2a and L15 are de-energized and energizes solenoid L2b, thereby causing hydraulic fluid to be forced into the lower end of the cylinder 32' to cause downward movement of the roll 38.

The hide continues to be pulled off the carcass and is pulled over and partially around the drum 17, and the chains 54 will drop from hooks 22 when the hide falls by gravity. The chains 21 continue to move because the hydraulic motor 19 continues to be driven. The time delay of time delay relay TDR-1 is set to prevent the downward movement of the roll 38 until the hide is completely stripped from the carcass.

Any time after the hide is stripped off the carcass, the operator may manually set the selector switch S15 to the desired starting position so that the roll 38 will automatically stop at the selected starting position.

When all the switches t4, t5 and t6 of the timer 235 open, the solenoid L5a is de-energized and to return the valve V5 to the position shown in FIGURE 4. Immediately thereafter the cam 299 actuates the switch arm 298 away from the contact 296, thus stopping the motor 302 and de-energizing the clutch coil L1; this enables the spring 240' to return the shaft 240 and the cams 239 which it carries to their initial starting positions. When the switches S10 or S11 or S12 are opened by roll 38 as the roll 38 reaches the starting position for which the selector switch S15 is set, the solenoid L2b is de-energized to block the flow of hydraulic fluid through the valve V2, thus causing the roller 38 to stop dead at the selected starting position. One of the circuits to the solenoid L8b is broken, but the solenoid L8b remains energized through closed switches S13 or S16 or S17 so the movement of the chains 21 is not interrupted. When switches S13 or S16 or S17 are opened by a chain hook 22, the solenoid L8b is de-energized, thus blocking the flow of hydraulic fluid at valve V8, to cause the hydraulic motor 19 to stop the movement of the chains 21. Horizontally aligned hooks 22 come to rest at approximately the level of the bottom of the roll 38. The solenoid L3b is also energized to open a flow path from the conduit 66 through the conduit 69 through the valve V3, the conduits 95 and 100 through the heat exchanger 96 and through the conduit 97 to the tank 64.

The shackles anchoring the freshly stripped carcass can now be removed. A new carcass is moved along the rail into stripping position. In the event the position of the roll 38 and the chains 21 with associated hooks 22 is such that the operator feels that the position of the rolls 38 should be changed based on carcass length, the operator manually moves the selector switch S15 to a different position.

Assuming the selector switch S15 is in position as shown in FIGURE 5, and that a shorter carcass is to be stripped, the selector switch S15 is moved so that switch arms 1S15 through 4S15 engage respective contacts b or c. Because the roll 38 has stopped in a position to hold the switch S12 open, circuits by either S10 or S11 are established by changing the position of the selector switch S15. The switch S6 must be manually actuated to energize relay K1 which in turn energizes L2a and L15, thus causing the roll to move upwardly toward switches S10 and S11. The roll, upon reaching either switch S10 or S11, depending upon the setting of the selector switch S15, stops dead. Solenoid L8a is also energized to cause movement of the chains 21 and its hooks 22 until either switches S16 or S13 are opened, thus re-establishing the relationship of the hooks 22 to the level of the underside of the roll 38.

Now let it be assumed that the roll 38 has stopped at its highest starting position as determined by the switch S10 and the next carcass to be stripped requires a lower starting position for the roll 38, the operator manually moves the selector switch S15; this automatically lowers the roll 38 to the selected lower position and also moves the chains 21 and its hooks 22 to establish the roll 38 and hooks 22 in proper relationship for starting a new stripping cycle.

Other embodiments and modifications of this invention will suggest themselves to those skilled in the art and all such of these as come within the spirit of the invention are included within its scope as best defined by the appended claims.

What is claimed is:

1. Apparatus for stripping hide from a drawn animal carcass, comprising, an upstanding frame, a generally horizontal member mounted movably on said frame, means for progressively moving said member upwardly in relation to the carcass at varying rates of speed to determine a variable angle at which the hide is stripped from the carcass and means connectable to the hide of the fore legs of the carcass to progressively draw the hide partially around said member and upwardly.

2. Apparatus for stripping hide from a drawn animal carcass, comprising a frame, a roll mounted for movement selectively in one direction and in the opposite direction, means movable in said one direction and engageable with the hide of the fore legs of a carcass for drawing the hide partially around the roll and in said one direction, and means for driving said roll in said one direction at varying rates of speed, to thereby strip the hide from the carcass at variable angles.

3. Apparatus for stripping hide from a drawn animal carcass, comprising: an upstanding frame, a pair of spaced apart sprockets at the upper end of said frame, a pair of spaced apart sprockets at the lower end of said frame, a pair of spaced apart continuous chains trained over said pairs of upper and lower sprockets, means for driving one of said sprockets to drive said chains, means for connecting the hide of the fore legs of the carcass to said chains, a roll movably mounted by said frame, and means for driving said roll upwardly so that the stripped hide passes in underlying relation to said roll and partially around said roll and said chains exert an upward pulling force on the hide of the fore legs to progressively strip the hide from the carcass.

4. Apparatus for stripping hide from a drawn animal carcass, comprising: first means for exerting a pulling force on the hide of the fore legs of a carcass to progressively strip hide from the carcass, and second means for exerting a counter-acting force against the stripped hide between the hide of the fore legs and the place where the hide is being stripped from the carcass, said second means progressively moving the counteracting force at varying rates of speed in relation to the place where the hide is being stripped so that the angle between the hide of the back of the carcass and the hide which has just been stripped from the back of the carcass is greater than the angle at which the pulling force is exerted by said first force exerting means.

5. Apparatus for stripping hide from a drawn animal carcass, comprising: an upstanding frame, a generally horizontal roll mounted movably on said frame, means for moving said roll selectively upwardly and downwardly including means for driving said roll upwardly at selected speeds, and means connectable to the hide of the fore legs of the carcass to progressively draw the hide partially around said roll and upwardly and said driving means being movable to define a variable angle at which the hide is stripped from the carcass.

6. Apparatus for stripping hide from a drawn animal carcass comprising: an upstanding frame, a roll mounted movably on said frame, means for moving said roll selectively upwardly and downwardly including means for moving said roll upwardly at selected speeds and means for automatically changing the speed at which said moving means moves said roll upwardly from one rate of speed to a faster rate of speed, and means connectable to the hide of the fore legs of the carcass to progressively draw the hide partially around the roll and upwardly, said roll moving to vary the angle between the stripped carcass and the hide being stripped from the carcass.

7. Apparatus for stripping hide from a drawn animal carcass, comprising: an upstanding frame, a roll movably mounted by said frame, a piston-cylinder mechanism for moving said roll upwardly and downwardly, separate throttling valve means through which hydraulic liquid can flow from said piston-cylinder mechanism to effect the rate of speed at which said roll is moved upwardly, means for effecting flow of the hydraulic liquid through one of said throttling valves, to cause travel of said roll at one rate of speed and for thereafter effecting flow of the hydraulic liquid through another of said throttling valve means to cause travel of said roll at another rate of speed for moving said roll upwardly of the carcass at varying rates of speed, and means connectable to the hide of the fore legs of the carcass to progressively draw the hide partially around said roll and upwardly, said roll varying the angle at which a portion of the hide between the roll and the carcass is progressively stripped from the carcass.

8. Apparatus for stripping hide from a drawn animal carcass, comprising: an upstanding frame, a continuous chain trained over sprockets at the upper and lower ends of said frame; hook means on said chain by which the hide of the fore legs of a carcass can be connected to said chains, means for driving said chain, a roll mounted movably on said frame, means connectable to the hide of the fore legs of the carcass to progressively draw the hide partially around the roll and upwardly, and means for interrupting the movement of said chain when the hook of said chain is approximately level with a starting position for said roll at the lower end of said frame.

9. Apparatus for stripping hide from a drawn animal carcass, comprising: an upstanding frame resting on a support surface, a roll mounted movably on said frame, means for moving said roll selectively upwardly and downwardly, a rail by which a cattle carcass can be suspended by its hind legs, means for positioning the roll at selected starting positions at selected distances from the surface on which said frame rests, a continuous chain trained over sprockets at the upper and lower ends of said frame, hook means on said chain by which the hide of the fore legs can be connected to said chain, manually settable means for causing the roll to move to a selected starting position, and means for interrupting the movement of said chain when the hook of said chain is approximately level with a starting position for which said roll is set.

10. Apparatus for stripping hide from a drawn animal carcass, comprising: an upstanding frame, a roll mounted movably on said frame, means for moving said roll selectively upwardly and downwardly, means connectable to the hide of the fore legs of the carcass to progressively draw the hide partially around the roll and upwardly, said roll being adapted for progressive movement upwardly of the carcass at varying rates of travel for determining a variable angle at which the hide is progressively stripped from the carcass, and time delay means for preventing the return of said roll toward hte lower end of said frame until the hide has been completely stripped from the carcass.

References Cited

UNITED STATES PATENTS 3,229,328   1/1966   Schmidt _____ 17—21

FOREIGN PATENTS 251,963   5/1964   Australia.

LUCIE H. LAUDENSLAGER, Primary Examiner

U.S. Cl. X.R.

17—45